(12) United States Patent
Lish et al.

(10) Patent No.: US 9,329,347 B1
(45) Date of Patent: May 3, 2016

(54) ADJUSTABLE CLAMP SLEEVE FOR BREAKAWAY BUNDLED INTERLOCKING DROP FIBER

(71) Applicant: Google Inc., Mountain View, CA (US)

(72) Inventors: David Frank Lish, Burlingame, CA (US); John Toccalino, Los Altos, CA (US); Ben Warren Segura, Morgan Hill, CA (US); Fabien Villeneuve, San Jose, CA (US); David Anthony, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/567,465

(22) Filed: Dec. 11, 2014

(51) Int. Cl.
*G02B 6/00* (2006.01)
*G02B 6/36* (2006.01)
*G02B 6/44* (2006.01)

(52) U.S. Cl.
CPC ............ *G02B 6/3616* (2013.01); *G02B 6/4471* (2013.01)

(58) Field of Classification Search
CPC .. G02B 6/3652; G02B 6/4471; G02B 6/3893; B29C 47/02
USPC ................. 385/133–134, 136, 115, 114, 137
See application file for complete search history.

(56) References Cited

U.S. PATENT DOCUMENTS

| | | | |
|---|---|---|---|
| 4,230,898 A * | 10/1980 | Emmel ................ | H01B 7/0838 156/55 |
| 4,356,599 A | 11/1982 | Larson et al. | |
| 5,142,745 A | 9/1992 | Setty et al. | |
| 5,905,231 A | 5/1999 | Houte et al. | |
| 6,188,822 B1 | 2/2001 | McAlpine et al. | |
| 6,356,690 B1 | 3/2002 | McAlpine et al. | |
| 6,487,200 B1 * | 11/2002 | Fraser ................. | H04L 12/6418 370/356 |
| 6,539,151 B2 | 3/2003 | Fajardo et al. | |
| 6,546,175 B1 | 4/2003 | Wagman et al. | |
| 6,563,990 B1 | 5/2003 | Hurley et al. | |
| 6,648,279 B1 | 11/2003 | Malin et al. | |
| 6,751,382 B2 * | 6/2004 | McGarvey ............. | F16L 3/222 174/168 |
| 6,785,450 B2 | 8/2004 | Wagman et al. | |
| 6,847,767 B2 | 1/2005 | Hurley et al. | |
| 6,861,590 B2 | 3/2005 | Rossi | |
| 6,909,050 B1 * | 6/2005 | Bradford .................. | H01B 7/40 174/110 R |
| 7,206,481 B2 | 4/2007 | Quinn et al. | |
| 7,367,534 B2 | 5/2008 | Franks, Jr. | |
| 7,391,943 B2 | 6/2008 | Blazer et al. | |
| 7,574,778 B2 | 8/2009 | Marathe | |
| 7,590,320 B2 | 9/2009 | Herbst | |
| 7,672,556 B2 | 3/2010 | Keller | |
| 8,447,062 B2 * | 5/2013 | Lin ....................... | H04R 1/1033 381/370 |
| 8,515,236 B2 | 8/2013 | Abernathy et al. | |
| 2005/0254768 A1 | 11/2005 | Franks | |
| 2006/0272846 A1 | 12/2006 | Weinberger | |
| 2012/0045084 A1 * | 2/2012 | Groset ................ | B29C 45/0055 381/384 |
| 2012/0106906 A1 | 5/2012 | Sakabe et al. | |
| 2012/0281955 A1 | 11/2012 | Hudson et al. | |

* cited by examiner

*Primary Examiner* — Ellen Kim
(74) *Attorney, Agent, or Firm* — Lerner, David, Littenberg, Krumholz & Mentlik, LLP

(57) ABSTRACT

The present disclosure relates to a clamp sleeve for a bundled fiber cable. The clamp sleeve includes a first actuating arm, a second actuating arm, and a hinge connecting the first actuating arm and the second actuating arm. The first actuating arm includes a first protuberance, a second protuberance, and a third protuberance, such that a slot forms between each protuberance. The second actuating arm a fourth protuberance, a fifth protuberance, and a sixth protuberance with a slot formed between the fourth, fifth, and sixth protuberances.

20 Claims, 8 Drawing Sheets

ADJUSTABLE CLAMP SLEEVE FOR BREAKAWAY BUNDLED INTERLOCKING DROP FIBER

CROSS-REFERENCE TO RELATED APPLICATIONS

This application is related to commonly owned co-pending U.S. application Ser. No. 14/567,415, entitled "Breakaway Bundled Interlocking Drop Fiber," the disclosure of which is hereby incorporated by reference herein in its entirety.

BACKGROUND

Various systems exist that are designed to protect optic fiber cable from damage once the cable is hung in the air. For example, a plastic spacer may be used to create space between the support strand and the optic fiber cable. A metal strap may then be used to secure the optic fiber cable, the plastic spacer, and the support strand. However, these solutions may add pressure and/or stress to the fiber optic cables when hung in the air that may shear or otherwise damage the fiber optic cables.

BRIEF SUMMARY

One aspect of the disclosure provides a clamp sleeve that includes a first actuating arm, a second actuating arm, and a hinge connecting the first actuating arm and the second actuating arm. The first actuating arm may include a first protuberance, a second protuberance, and a third protuberance. Further, a first slot may be formed between the first protuberance and the second protuberance and a second slot between the second protuberance and the third protuberance. The second actuating arm may include a fourth protuberance, a fifth protuberance, and a sixth protuberance. Additionally, a third slot may be formed on the second actuating arm between the fourth protuberance and the fifth protuberance and a fourth slot may be formed between the fifth protuberance and the sixth protuberance.

In some examples, the hinge is an expandable hinge, such as an accordion style hinge. Additionally, the first protuberance, second protuberance, and third protuberance may each have a strength member located therein. Similarly, the fourth, fifth, and sixth protuberances may also have a strength member located within each protuberance. According to some examples, the strength members may be made of a dielectric material.

Additional examples may include a plurality of tabs and grooves located on a surface of the first, second, and third protuberances. Similarly, the fourth, fifth, and sixth protuberances may each have a plurality of tabs and grooves located on a surface thereof. Furthermore, when support hardware is closed around the clamp sleeve, a coefficient of friction between the support hardware and the clamp sleeve may be greater than or equal to one. In some examples, the clamp sleeve may have an outer material made of rubber.

Another aspect of the disclosure describes a system that includes a network access point, a plurality of network interface units, and a plurality of communication cables interconnecting the plurality of network interface units with the network access point. The system may also include a clamp sleeve for securing the plurality of communication cables.

According to some examples, the clamp sleeve may include a first actuating arm, a second actuating arm, and a hinge connecting the first actuating arm and the second actuating arm. A first protuberance, a second protuberance, and a third protuberance may be located on the first actuating arm. Additionally, a slot may be formed between each of the protuberances located on the first actuating arm. The second actuating arm may include a fourth protuberance, a fifth protuberance, and a sixth protuberance with slots formed between each protuberance.

In some examples, the hinge is an expandable hinge, such as an accordion style hinge. Additionally, the first protuberance, second protuberance, and third protuberance may each have a strength member located therein. Similarly, the fourth, fifth, and sixth protuberances may also have a strength member located within each protuberance. According to some examples, the strength members may be made of a dielectric material.

Additional examples may include a plurality of tabs and grooves located on a surface of the first, second, and third protuberances. Similarly, the fourth, fifth, and sixth protuberances may each have a plurality of tabs and grooves located on a surface thereof. Furthermore, when support hardware is closed around the clamp sleeve, a coefficient of friction between the outer surface of the clamp sleeve and the support hardware may be greater than or equal to one. For example, the outer surface of the clamp sleeve may be rubber.

DETAILED DESCRIPTION

Figure 1:
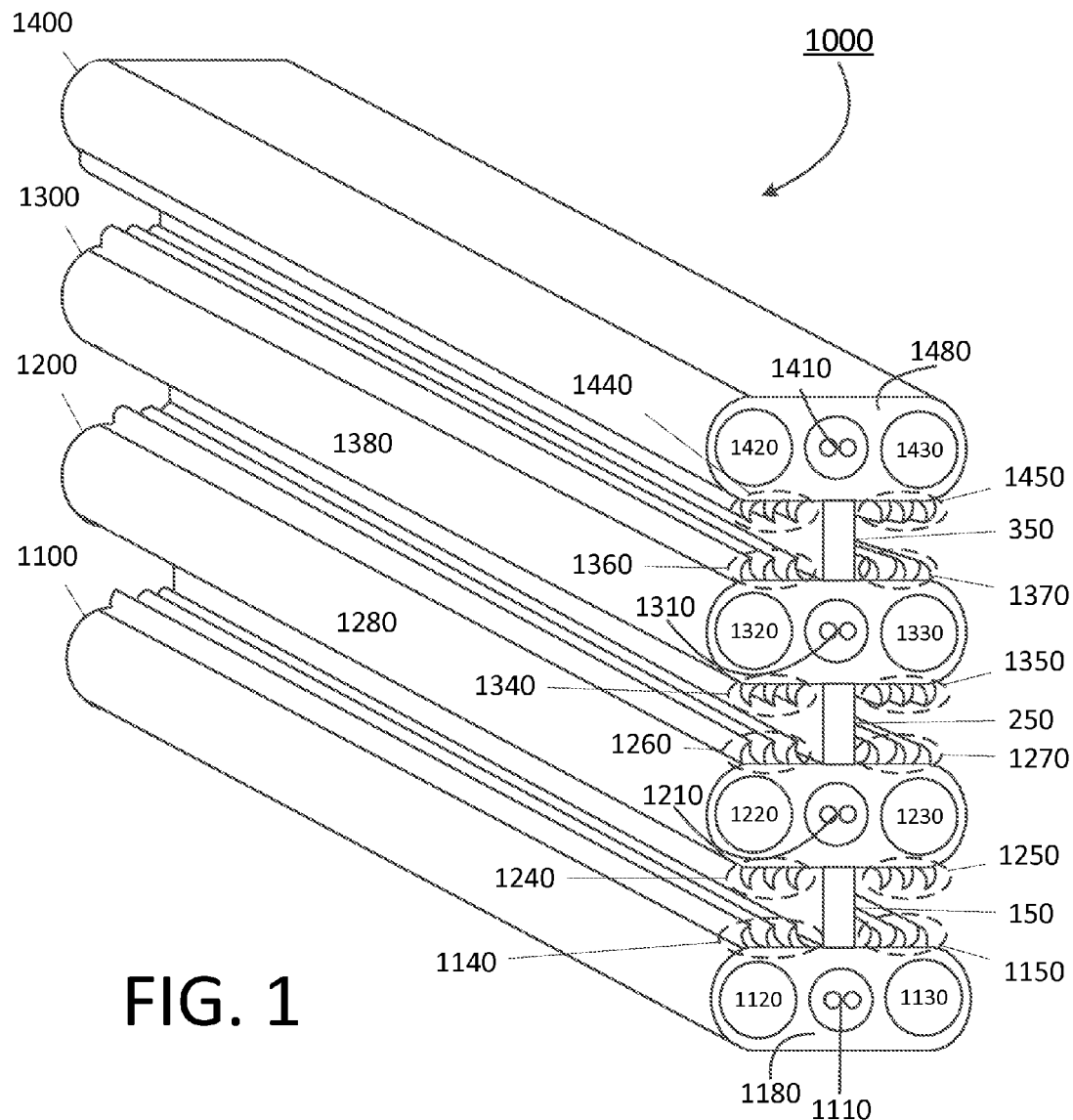
FIG. 1 is an example of a bundled fiber cable.

According to at least one aspect of the present disclosure, an adjustable clamp sleeve may be connected to a bundled fiber cable or an interlocked bundle. A bundled fiber cable may include two or more fiber optic cables attached to each other via a webbing. Each fiber optic cable may be similar to standard flat drop cables or slotted core ribbon fiber optic cables. In some examples, the individual fiber optic cables may have a plurality of tabs and grooves located on their outer sheathing. Furthermore, each individual fiber optic cable may contain a plurality of fiber strands capable of transmitting data. Each fiber optic cable may also have two dielectric strength members on either side of the fiber strands to strengthen the fiber optic cable and absorb stress to mitigate shearing the fiber strands. The space between the fiber optic cables connected via the webbing may create a slot approximately the height of an individual fiber optic cable. The use of the webbing and the dielectric strength members allow the bundled fiber cable to be self-supporting.

Additionally, a first bundled fiber cable may be removably attached to a second bundled fiber cable to form an interlocked bundle. The interlocked bundle may be formed by inserting a first fiber optic cable from the first bundled fiber cable into a slot of the second bundled fiber cable. Furthermore, the plurality of tabs and grooves of the first fiber optic cable may align with a plurality of tabs and grooves of the fiber optic cables that make up the slot to further secure the bundle. Moreover, at least one of the dielectric strength members of the first fiber optic cable may align with one of the dielectric strength members of the fiber optic cables of that form the slot to provide additional strength to the interlocked bundle.

The bundled fiber cable may be connected to a utility pole via a drop wire clamp that uses compression of the bundled fiber cable to suspend the bundled fiber cable from the pole. The adjustable clamp sleeve described herein may be clamped onto the bundled fiber cable before the bundled fiber cable is attached to a utility pole using support hardware to distribute the stress and/or strain the support hardware may have on the bundled fiber cable.

The adjustable clamp sleeve may include a first actuating arm and a second actuating arm connected by a hinge. In one arrangement, the clamp is a U-shaped adjustable sleeve capable of wrapping around approximately three-quarters of the bundled fiber cable. Additionally, the hinge may be expandable, such as an accordion style hinge, to accommodate an interlocked bundle. Each actuating arm may have between three and six protuberances, such that each adjustable clamp sleeve has a total of about 6-12 total protuberances and a slot formed between each protuberance. Each of the protuberances may be inserted into a slot on the bundled fiber cable and each of the fiber optic cables may be inserted into the slot formed between each protuberance.

In some examples, each of the protuberances includes a plurality of tabs and grooves. When the adjustable clamp sleeve is closed around the bundled fiber cable, these tabs and grooves may interconnect with the tabs and grooves located on the individual fiber optic cables. Additionally, a strength member may be located in each of the protuberances. This strength member may be the same material as the strength member used in the fiber optic cables. Accordingly, the protuberance strength members of the adjustable clamp sleeve may align with the strength members of the fiber optic cables when the adjustable clamp sleeve is closed around the bundled fiber cable. In this regard, the strength members may provide additional support and mitigate shearing of the fiber strands.

Additionally, the coefficient of friction between the clamp sleeve and the support hardware may be greater than or equal to 1 to prevent slippage of the support hardware when the support hardware is closed around the clamp sleeve. In some examples, the outer material may include a textured surface, a rubber material, or a combination thereof.

The above-described features may allow for a secure attachment of the bundled fiber cable to the utility pole. Additionally, the expandable hinge may allow the sleeve to fit a variety of interlocked bundle configurations.

Turning to FIG. 1, a bundled fiber cable 1000 according to one example is shown. The bundled fiber cable 1000 may include a first fiber optic cable 1100, a second fiber optic cable 1200, a third fiber optic cable 1300, and a fourth fiber optic cable 1400. The fiber optic cables 1100, 1200, 1300, and 1400 may be similar to standard flat drop cables or slotted core ribbon fiber optic cables.

The dimensions of the bundled fiber cable may correspond with the application. For instance, in many applications, the bundled fiber cable 1000 may have a height between about 1¼ inches and about 3 inches and a width between ¼ inch and about ½ inch. When used to connect with homes, it may be useful for the height to be between about 1½ inches and about 2 inches. While such ranges may provide certain advantages in certain applications, the dimensions of the bundled fiber cable may also be larger or smaller than such ranges.

The first fiber optic cable 1100 may be attached to the second fiber optic cable 1200 by a member, such as a webbing 150; the second fiber optic cable 1200 may be attached to the third fiber optic cable 1300 by webbing 250; and the third fiber optic cable 1300 may attached to the fourth fiber optic cable 1400 by webbing 350. While four interconnected, fiber optic cables are shown in FIG. 1, other examples may include as few as two fiber optic cables interconnected by a single webbing. When used to connect with homes, it may be useful for up to six fiber optic cables to be connected by five webbings.

The first fiber optic cable 1100 may include a plurality of fiber optic strands 1110, a first dielectric strength member 1120, and a second dielectric strength member 1130. The plurality of fiber strands 1110 may be capable of transmitting and receiving data. Further, the first dielectric strength member 1120 and the second dielectric strength member 1130 may be located on either side of the plurality of fiber optic strands 1110. The first dielectric strength member 1120 and the second dielectric strength member 1130 may be a hard resin, metal cable, or any other material capable of strength the fiber optic cable and absorbing stress to mitigate shearing of the fiber strands.

The plurality of fiber optic strands 1110, the first dielectric strength member 1120, and the second dielectric strength member 1130 may be encased in a first sheathing 1180. The first fiber optic cable 1100 may include a first plurality of tabs and grooves 1140 and a second plurality of tabs and grooves 1150 on the first sheathing 1180. Although 3 tabs are shown at tabs and grooves 1140, and although 2-4 tabs may provide certain advantages in certain applications, any number of tabs and grooves may be used. The first plurality of tabs and grooves 1140 and the second plurality of tabs and grooves 1150 may be used to interconnect with tabs and grooves located on other fiber optic cables, other bundled fiber cables, or protuberances of support hardware. Further, although the first and second plurality of tabs and grooves are shown on top of the fiber optic cable 1100, the tabs and grooves may be located on other surfaces of the fiber optic cable depending on the application.

Like the first fiber optic cable 1100, the second fiber optic cable 1200 may include a plurality of fiber optic strands 1210, a first dielectric strength member 1220, and a second dielectric strength member 1230. The plurality of fiber strands 1210 may be capable of transmitting and receiving data. Additionally, the first dielectric strength member 1220 and the second dielectric strength member 1230 may be located on the same plane on opposite sides of the plurality of fiber optic strands 1210.

A second sheathing 1280 may be used to encase the plurality of fiber optic strands 1210, the first dielectric strength member 1220, and the second dielectric strength member 1230. The second sheathing 1280 may include a first plurality of tabs and grooves 1240, a second plurality of tabs and grooves 1250, a third plurality of tabs and grooves 1260, and a fourth plurality of tabs and grooves 1270. Accordingly, each plurality of tabs and grooves may be used to interlock with another plurality of tabs and grooves located on other fiber optic cables, other bundled fiber cables, or protuberances as discussed above.

A webbing 150 may connect the first fiber optic cable 1100 to the second fiber optic cable 1200. The webbing 150, the first sheathing 1180, and the second sheathing 1280 may form two slots between the fiber optic cable 1100 and the second fiber optic cable 1200. Each slot may be approximately the height of an individual fiber optic cable. In this regard, each slot may be configured to receive a fiber optic cable.

The webbing 150 may be configured to facilitate cutting such that the first fiber optic cable 1100 may be peeled away from the second fiber optic cable 1200 and the bundled fiber cable 1000. The webbing 150 may be the same material as the sheathings 1180, 1280 of the first fiber optic cable 1100 and the second fiber optic cable 1200. In some examples, the webbing 150 may be perforated to allow for easier separation of the first fiber optic cable 1100 and the second fiber optic cable 1200. In other examples, the webbing 150 may include a pattern, such as a honeycomb or a series of holes, to help in the peeling the first fiber optic cable 1100 from the bundled fiber cable 1000, with or without the assistance of a cutting tool.

Similar to the first and second fiber optic cables, the third fiber optic cable 1300 may include a plurality of fiber optic strands 1310, a first dielectric strength member 1320, and a second dielectric strength member 1330. The plurality of fiber strands 1310 may be capable of transmitting and receiving data. A third sheathing 1380 may enclose the plurality of fiber optic strands 1310, the first dielectric strength member 1320, and the second dielectric strength member 1330 to form the third fiber optic cable 1300. The third sheathing 1380 may include a first plurality of tabs and grooves 1340, a second plurality of tabs and grooves 1350, a third plurality of tabs and grooves 1360, and a fourth plurality of tabs and grooves 1370.

A webbing 250 may interconnect the second fiber optic cable 1200 to the third fiber optic cable 1300. The webbing 250 may form two slots—one on each side of the webbing 250 between the second fiber optic cable 1200 and the third fiber optic cable 1300.

The fourth fiber optic cable 1400 may include a plurality of fiber optic strands 1410, a first dielectric strength member 1420, and a second dielectric strength member 1430. The plurality of fiber optic strands 1410, the first dielectric strength member 1420, and the second dielectric strength member 1430 may be enclosed in a fourth sheathing 1480. The fourth sheathing 1480 may include a first plurality of tabs and grooves 1440, a second plurality of tabs and grooves 1450, a third plurality of tabs and grooves 1460, and a fourth plurality of tabs and grooves 1470.

A webbing 350 may connect the third fiber optic cable 1300 to the fourth fiber optic cable 1400. The webbing 350 may form two slots. For example, each slot may be bounded by the third fiber optic cable 1300, the webbing 350, and the fourth fiber optic cable 1400.

Figure 2:
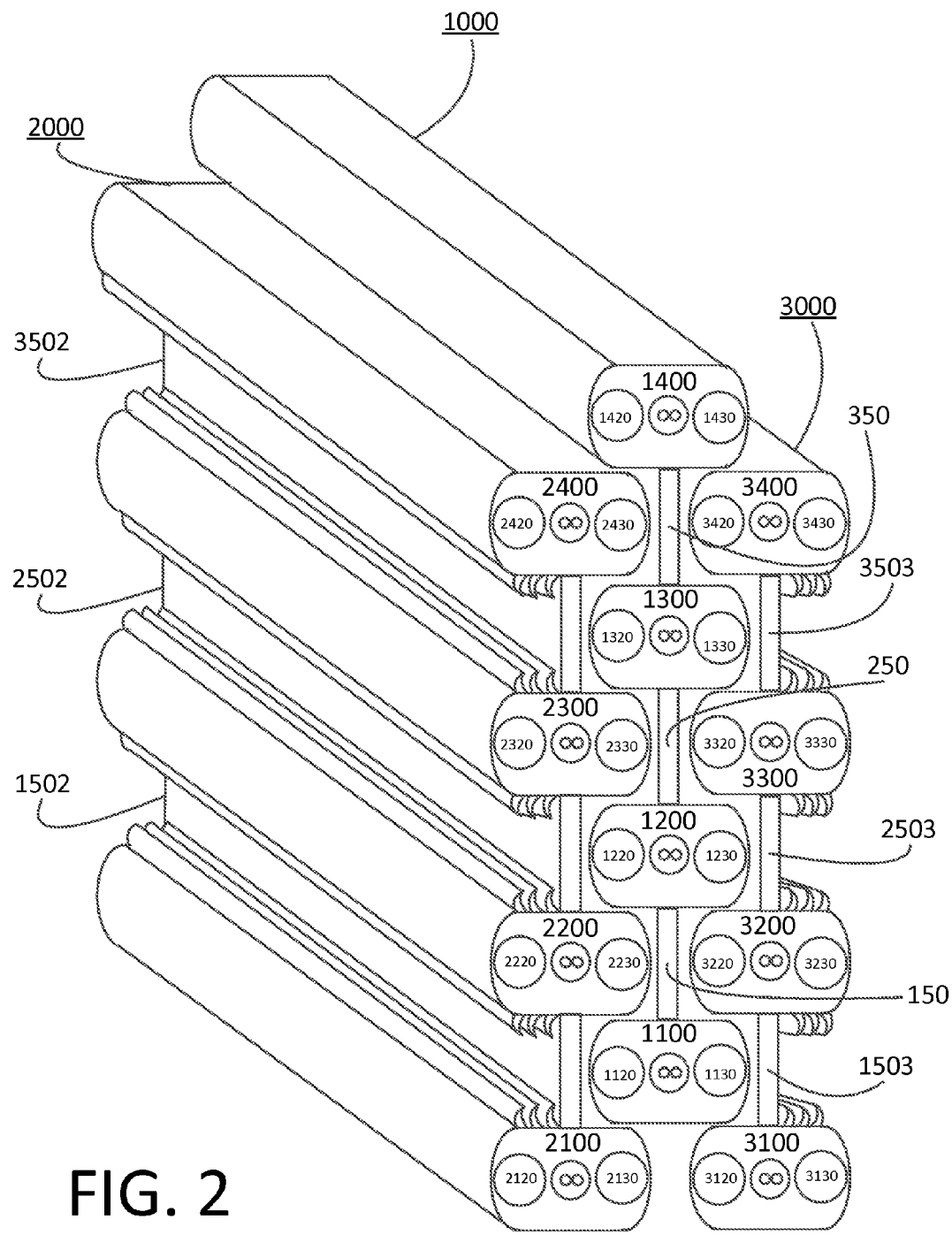
FIG. 2 provides an example of an interlocked bundle.

Turning to FIG. 2, an example of an interlocked bundle 5000 is shown. The interlocked bundle includes a first bundled fiber cable 1000, a second bundled fiber cable 2000, and a third bundled fiber cable 3000. While FIG. 2 shows three bundled fiber cables forming the interlocked bundle 5000, additional bundled fiber cable may be included. Similarly, fewer bundled fiber cables may be used to form the interlocked bundle 5000.

By attaching a second bundled fiber cable 2000 to first bundled fiber cable 1000, the resultant interlocked bundle may include a fifth fiber optic cable 2100, a sixth fiber optic cable 2200, a seventh fiber optic cable 2300, and a eighth fiber optic cable 2400. The fiber optic cables 2100, 2200, 2300, and 2400 may be similar to standard flat drop cables or slotted core ribbon fiber optic cables.

The second bundled fiber cable 2000 may be compared to the first bundled fiber cable 1000. In this regard, the fifth fiber optic cable 2100 may be attached to the sixth fiber optic cable 2200 by a webbing 1502; the sixth fiber optic cable 2200 may be attached to the seventh fiber optic cable 2300 by a webbing 2502; and the seventh fiber optic cable 2300 may be attached to the eighth fiber optic cable 2400 by a webbing 3502.

The fifth fiber optic cable 2100 may include a plurality of fiber optic strands, a first dielectric strength member 2120, and a second dielectric strength member 2130. The plurality of fiber optic strands, the first dielectric strength member 2120, and the second dielectric strength member 2130 may be encased in a fifth sheathing. The fifth fiber optic cable 2100 may include a first plurality of tabs and grooves and a second plurality of tabs and grooves on the fifth sheathing. The first plurality of tabs and grooves and the second plurality of tabs and grooves may be used to interconnect with tabs and grooves located on the first fiber optic cable 1100.

The sixth fiber optic cable 2200 may include a plurality of fiber optic strands which are capable of transmitting and receiving data, a first dielectric strength member 2220, and a second dielectric strength member 2230. A sixth sheathing may be used to encase the plurality of fiber optic strands, the first dielectric strength member 2220, and the second dielectric strength member 2230. The sixth sheathing may include a first plurality of tabs and grooves, a second plurality of tabs and grooves, a third plurality of tabs and grooves, and a fourth plurality of tabs and grooves.

A webbing 1502 may connect the fifth fiber optic cable 2100 to the sixth fiber optic cable 2200. The webbing 1502 may form two slots between the fiber optic cable 2100 and the second fiber optic cable 2200. For example, each slot may be configured to receive a fiber optic cable. Turning to FIG. 2, the first fiber optic cable 1100 may be placed in the slot formed by the fifth fiber optic cable 2100, the sixth fiber optic cable 2200, and the webbing 1502.

The seventh fiber optic cable 2300 may include a plurality of fiber optic strands for transmitting and receiving data, a first dielectric strength member 2320, and a second dielectric strength member 2330. A seventh sheathing may enclose the plurality of fiber optic strands, the first dielectric strength member 2320, and the second dielectric strength member 2330 to form the seventh fiber optic cable 2300. The seventh sheathing may include a first plurality of tabs and grooves, a second plurality of tabs and grooves, a third plurality of tabs and grooves, and a fourth plurality of tabs and grooves.

The sixth fiber optic cable 2200 may be attached to the seventh fiber optic cable 2300 by webbing 2502. The webbing 2502 may form two slots—one on each side of the webbing 2502 between the sixth fiber optic cable 2200 and the seventh fiber optic cable 2300.

The eighth fiber optic cable 2400 may include a plurality of fiber optic strands for sending and receiving data, a first dielectric strength member 2420, and a second dielectric strength member 2430. The plurality of fiber optic strands, the first dielectric strength member 2420, and the second dielectric strength member 2430 may be enclosed in an eighth sheathing. The eighth sheathing may include a first plurality of tabs and grooves, a second plurality of tabs and grooves, a third plurality of tabs and grooves, and a fourth plurality of tabs and grooves.

The seventh fiber optic cable 2300 may be connected to the eighth fiber optic cable 2400 by a webbing 3502. The webbing 3502 may form two slots. For example, each slot may be bounded by the seventh fiber optic cable 2300, the webbing 3502, and the eighth fiber optic cable 2400. For example, FIG. 2 shows the third fiber optic cable 1300 inserted in the slot formed by the seventh fiber optic cable 2300, the eighth fiber optic cable 2400 and the webbing 3502.

To form an interlocked bundle between the first bundled fiber cable 1000 and the second bundled cable 2000, the fiber optic cables of the first bundled fiber cable may be inserted into the slots of the second bundled fiber cable and vice versa. For example, the first fiber optic cable 1100 may be inserted into the slot formed by the fifth fiber optic cable 2100, the sixth fiber optic cable 2200, and the webbing 1502; the second fiber optic cable 1200 may be inserted into the slot formed by the sixth fiber optic cable 2200, the seventh fiber optic cable 2300, and the webbing 2502; and the third fiber optic cable 1300 may be inserted into the slot formed by the seventh fiber optic cable 2300, the eight fiber optic cable 2400, and the webbing 3502. Further, the sixth fiber optic cable 2200 may be inserted into the slot formed by the first fiber optic cable 1100, the second fiber optic cable 1200, and the webbing 150; the seventh fiber optic cable 2300 may be inserted into the slot formed by the second fiber optic cable 1200, the third fiber optic cable 1300, and the webbing 250; and the eighth fiber optic cable 2400 may be inserted into the slot formed by the third fiber optic cable 1300, the fourth fiber optic cable 1400, and the webbing 350. Furthermore, at least one of the dielectric strength members of each of the fiber optic cables may align with other dielectric strength members of other fiber optic cables. For example, as shown in FIG. 2, the dielectric strength members 1420, 2430, 1320, 2330, 1220, 2230, 1120, and 2130 may be in the same plane. This helps to improve the strength and stability of the interlocked bundle when the interlocked bundle is secured to utility poles. Moreover, the plurality of tabs and grooves located on the sheathing of each of the fiber optic cables may be removably connected to form a more secure interconnection. Thus, an interlocked bundle is formed from the first bundled fiber cable 1000 and the second bundled fiber cable 2000.

The third bundled fiber cable 3000 may be compared to the first bundled fiber cable 1000 and may include a ninth fiber optic cable 3100, a tenth fiber optic cable 3200, an eleventh fiber optic cable 3300, and a twelfth fiber optic cable 3400. The ninth fiber optic cable 3100 may be connected to the tenth fiber optic cable 3200 by webbing 1503; the tenth fiber optic cable 3200 may be attached to the eleventh fiber optic cable 3300 by webbing 2503; and the eleventh fiber optic cable 3300 may be connected to the twelfth fiber optic cable 3400 by webbing 3503.

The ninth fiber optic cable 3100 may include a plurality of fiber optic strands, a first dielectric strength member 3120, and a second dielectric strength member 3130. The plurality of fiber optic strands, the first dielectric strength member 3120, and the second dielectric strength member 3130 may be encased in a ninth sheathing. The ninth fiber optic cable 3100 may include a first plurality of tabs and grooves and a second plurality of tabs and grooves on the ninth sheathing.

The tenth fiber optic cable 3200 may include a plurality of fiber optic strands, which are capable of transmitting and receiving data, a first dielectric strength member 3220, and a second dielectric strength member 3230. A tenth sheathing may be used to encase the plurality of fiber optic strands, the first dielectric strength member 3220, and the second dielectric strength member 3230. The tenth sheathing may include a first plurality of tabs and grooves, a second plurality of tabs and grooves, a third plurality of tabs and grooves, and a fourth plurality of tabs and grooves.

The ninth fiber optic cable 3100 may be attached to the tenth fiber optic cable 3200 by a webbing 1503. The webbing 1503 may form two slots between the ninth fiber optic cable 3100 and the tenth fiber optic cable 3200. Turning to FIG. 2, the first fiber optic cable 1100 may be placed in the slot formed by the ninth fiber optic cable 3100, the tenth fiber optic cable 3200, and the webbing 1503.

The eleventh fiber optic cable 3300 may include a plurality of fiber optic strands for transmitting and receiving data, a first dielectric strength member 3320, and a second dielectric strength member 3330. An eleventh sheathing may enclose the plurality of fiber optic strands, the first dielectric strength member 3320, and the second dielectric strength member 3330 to form the eleventh fiber optic cable 3300. The eleventh sheathing may include a first plurality of tabs and grooves, a second plurality of tabs and grooves, a third plurality of tabs and grooves, and a fourth plurality of tabs and grooves.

The tenth fiber optic cable 3200 may be attached to the eleventh fiber optic cable 3300 by a webbing 2503. The webbing 2503 may form two slots—one on each side of the webbing 2503 between the tenth fiber optic cable 3200 and the eleventh fiber optic cable 3300.

The twelfth fiber optic cable 3400 may include a plurality of fiber optic strands, a first dielectric strength member 3420, and a second dielectric strength member 3430. The plurality of fiber optic strands, the first dielectric strength member 3420, and the second dielectric strength member 3430 may be enclosed in an twelfth sheathing. The twelfth sheathing may include a first plurality of tabs and grooves, a second plurality of tabs and grooves, a third plurality of tabs and grooves, and a fourth plurality of tabs and grooves.

A webbing 3503 may attach the eleventh fiber optic cable 3300 to the twelfth fiber optic cable 3400. The webbing 3503 may form two slots. For example, each slot may be bounded by the eleventh fiber optic cable 3300, the webbing 3503, and the twelfth fiber optic cable 3400. For example, FIG. 2 shows the third fiber optic cable 1300 inserted in the slot formed by the tenth fiber optic cable 3300, the twelfth fiber optic cable 3400 and the webbing 3503.

To form an interlocked bundle between the first bundled fiber cable 1000 and the third bundled cable 3000, the fiber optic cables of the first bundled fiber cable may be inserted into the slots of the third bundled fiber cable and vice versa. For example, the first fiber optic cable 1100 may be inserted into the slot formed by the ninth fiber optic cable 3100, the tenth fiber optic cable 3200, and the webbing 1503; the second fiber optic cable 1200 may be inserted into the slot formed by the tenth fiber optic cable 3200, the eleventh fiber optic cable 3300, and the webbing 2503; and the third fiber optic cable 1300 may be inserted into the slot formed by the eleventh fiber optic cable 3300, the twelfth fiber optic cable 3400, and the webbing 3503. Further, the tenth fiber optic cable 3200 may be inserted into the slot formed by the first fiber optic cable 1100, the second fiber optic cable 1200, and the webbing 150; the eleventh fiber optic cable 3300 may be inserted into the slot formed by the second fiber optic cable 1200, the third fiber optic cable 1300, and the webbing 250; and the twelfth fiber optic cable 3400 may be inserted into the slot formed by the third fiber optic cable 1300, the fourth fiber optic cable 1400, and the webbing 350. Furthermore, at least one of the dielectric strength members of each of the fiber optic cables may align with other dielectric strength members of other fiber optic cables. For example, as shown in FIG. 2, the dielectric strength members 1430, 3420, 1330, 3320, 1230, 3220, 1130, and 3120 may be in the same plane. This helps to improve the strength and stability of the interlocked bundle when the interlocked bundle is secured to utility poles. Moreover, the plurality of tabs and grooves located on the sheathing of each of the fiber optic cables may be removably connected to form a more secure interconnection. Thus, an interlocked bundle is formed from the first bundled fiber cable 1000, the second bundled fiber cable 2000, and the third bundled fiber cable 3000.

Figure 3:
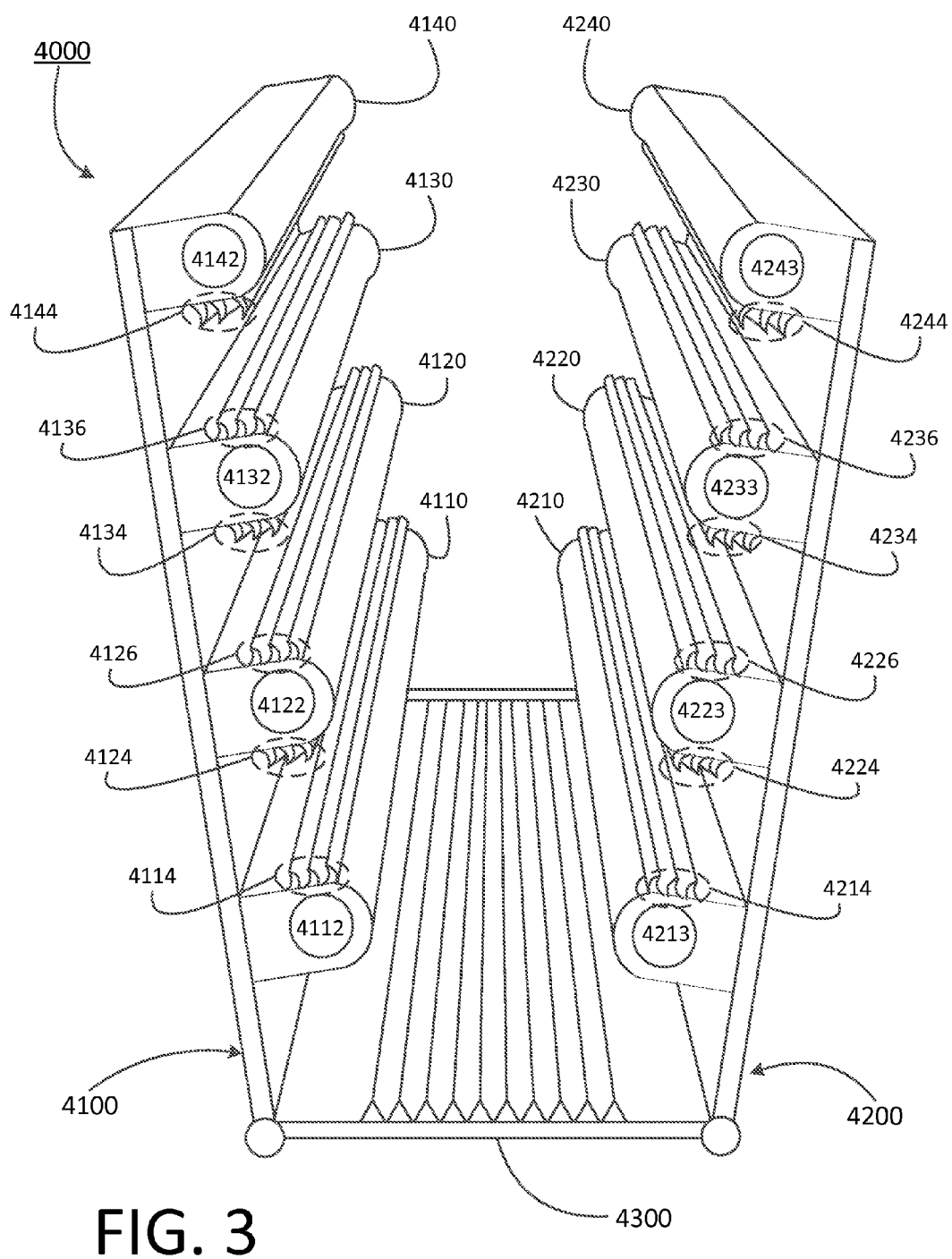
FIG. 3 shows an example of an adjustable clamp sleeve.

Turning to FIG. 3, an example of an adjustable clamp sleeve 4000 is shown. The adjustable clamp sleeve 4000 may include a first actuating arm 4100 and a second actuating arm 4200 connected by a hinge 4300. In one arrangement, the adjustable clamp sleeve 4000 is a U-shaped adjustable sleeve capable of wrapping around approximately three-quarters of the bundled fiber cable as shown in greater detail in FIGS. 4A and 4B. The hinge 4300 may be expandable, such as an accordion style hinge, to accommodate an interlocked bundle. The first actuating arm 4100 and the second actuating arm 4200 may be constructed from plastic, metal, or any other suitable material. Additionally, the first actuating arm 4100 and the second actuating arm 4200 may swing open and closed where the actuating arms connect to the hinge 4300. The first actuating arm 4100, the second actuating arm 4200, and the hinge 4300 may include a material to increase the grip of the support hardware when closed on the adjustable clamp sleeve 4000. For instance, the surface texture and composition of the material may provide a relatively high coefficient of static friction (e.g., $\mu \geq 1$) between the support hardware and the adjustable clamp sleeve 4000 in order to impede slippage when the support hardware is closed around the sleeve. By way of example, the outer material may be rubber or textured to have a high surface roughness.

Each actuating arm may have between three and six protuberances, such that each adjustable clamp sleeve has a total of between 6 and 12 total protuberances. While such ranges may provide certain advantages in certain applications, the number of protuberances may also be larger or smaller than such ranges.

Further, a slot may be formed between each protuberance. As shown in FIG. 3, the first actuating arm 4100 may include a first protuberance 4110, a second protuberance 4120, a third protuberance 4130, and a fourth protuberance 4140. The second actuating arm may include a fifth protuberance 4210, a sixth protuberance 4220, a seventh protuberance 4230, and an eight protuberance 4240.

In some examples, each of the protuberances includes a plurality of tabs and grooves. For example, the first protuberance 4110 may include a first plurality of tabs and grooves 4114; the second protuberance 4120 may include a second plurality of tabs and grooves 4124 and a third plurality of tabs and grooves 4126, the third protuberance 4130 may include a fourth plurality of tabs and grooves 4134 and a fifth plurality of tabs and grooves 4136; and the fourth protuberance 4140 may include a sixth plurality of tabs and grooves 4144. Similarly, the fifth protuberance 4210 may have a seventh plurality of tabs and grooves 4214; the sixth protuberance 4220 may have an eight plurality of tabs and grooves 4224 and a ninth plurality of tabs and grooves 4226; the seventh protuberance 4230 may have a tenth plurality of tabs and grooves 4234 and an eleventh plurality of tabs and grooves 4236; and the eighth protuberance 4240 may include a twelfth plurality of tabs and grooves 4244.

According to other examples, each of the protuberances may include a strength member. For example, the first protuberance 4110 may include a first dielectric strength member 4112; the second protuberance 4120 may include a second dielectric strength member 4122; the third protuberance 4130 may comprise a third dielectric strength member 4132; the fourth protuberance 4140 may include a fourth dielectric strength member 4142; the fifth protuberance 4210 may include a fifth dielectric strength member 4213; the sixth protuberance 4220 may comprise a sixth dielectric strength member 4223; the seventh protuberance 4230 may include a seventh dielectric strength member 4233; and the eighth protuberance 4240 includes an eighth dielectric strength member 4243. Each of the strength members may be centrally located in each of the protuberances. In some examples, the strength member located in each protuberance may be a dielectric material, a hard resin, metal cable, or any other material capable of strength the fiber optic cable and absorbing stress to mitigate shearing of the fiber strands.

Figure 4A:
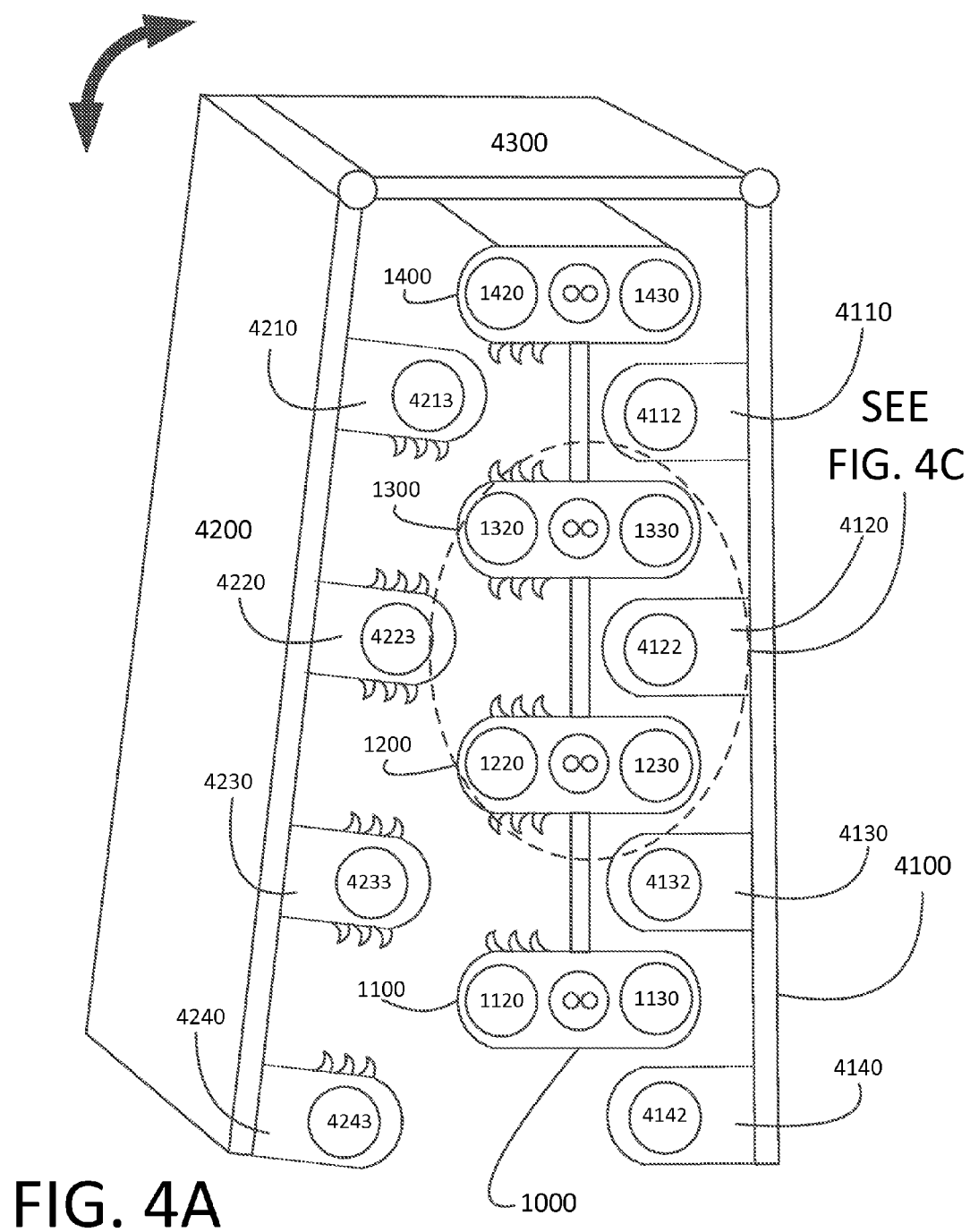
FIG. 4A illustrates an example of the adjustable clamp sleeve and a bundled fiber cable.

FIG. 4A shows an example of the adjustable clamp sleeve 4000 closed around the bundled fiber cable 1000. According to the example shown, the first fiber optic cable 1100 may be inserted into a slot between the third protuberance 4130 and the fourth protuberance 4140 on the first actuating arm 4100 and the seventh protuberance 4230 and the eight protuberance 4240 on the second actuating arm 4200. The second fiber optic cable 1200 may be inserted into a slot between the second protuberance 4120 and the third protuberance 4130 on the first actuating arm 4100 and the sixth protuberance 4220 and the seventh protuberance 4230 on the second actuating arm 4200. The third fiber optic cable 1300 may interlock in the slot between the first protuberance 4110 and the second protuberance 4120 on the first actuating arm 4100 and the fifth protuberance 4120 and the sixth protuberance 4220 on the second actuating arm 4200. The fourth fiber optic cable 1400 may fit between the first protuberance 4110, the fifth protuberance 4210, and the hinge 4300.

Furthermore, each of the protuberances of the adjustable clamp sleeve 4000 may be inserted into a slot on the bundled fiber cable 1000. For example, the first protuberance 4110 and the fifth protuberance 4210 may interlock in the slots formed between the fourth fiber optic cable 1400 and the third fiber optic cable 1300; the second protuberance 4120 and the sixth protuberance 4220 may be inserted into the slots formed between the third fiber optic cable 1300 and the second fiber optic cable 1200; and the third protuberance 4130 and the seventh protuberance 4230 may interconnect in the slots formed between the second fiber optic cable 1200 and the first fiber optic cable 1100. The fourth protuberance 4140 and the eighth protuberance 4240 may sit below the first fiber optic cable 1100. In some examples, the plurality of tabs and grooves of each protuberance may interconnect with the tabs and grooves of the fiber optic cables to further secure the assembly of the adjustable clamp sleeve 4000 and the bundled fiber cable 1000.

According to some examples, the dielectric strength members of the adjustable clamp sleeve 4000 may align with the dielectric strength members of the bundled fiber cable 1000 when the adjustable clamp sleeve 4000 is closed around the bundled fiber cable 1000. For example, the dielectric strength members 1420, 4213, 1320, 4223, 1220, 4233, 1120, and 4243 may align when the adjustable clamp sleeve 4000 encloses the bundled fiber cable 1000. Further, the dielectric strength members 1430, 4112, 1330, 4122, 1230, 4132, 1130, and 4142 may be in the same plane when the protuberances of the adjustable clamp sleeve 4000 connect with the fiber optic cables of the bundled fiber cable 1000. Accordingly, aligning the strength members may provide additional support and mitigate shearing of the fiber strands.

Figure 4B:
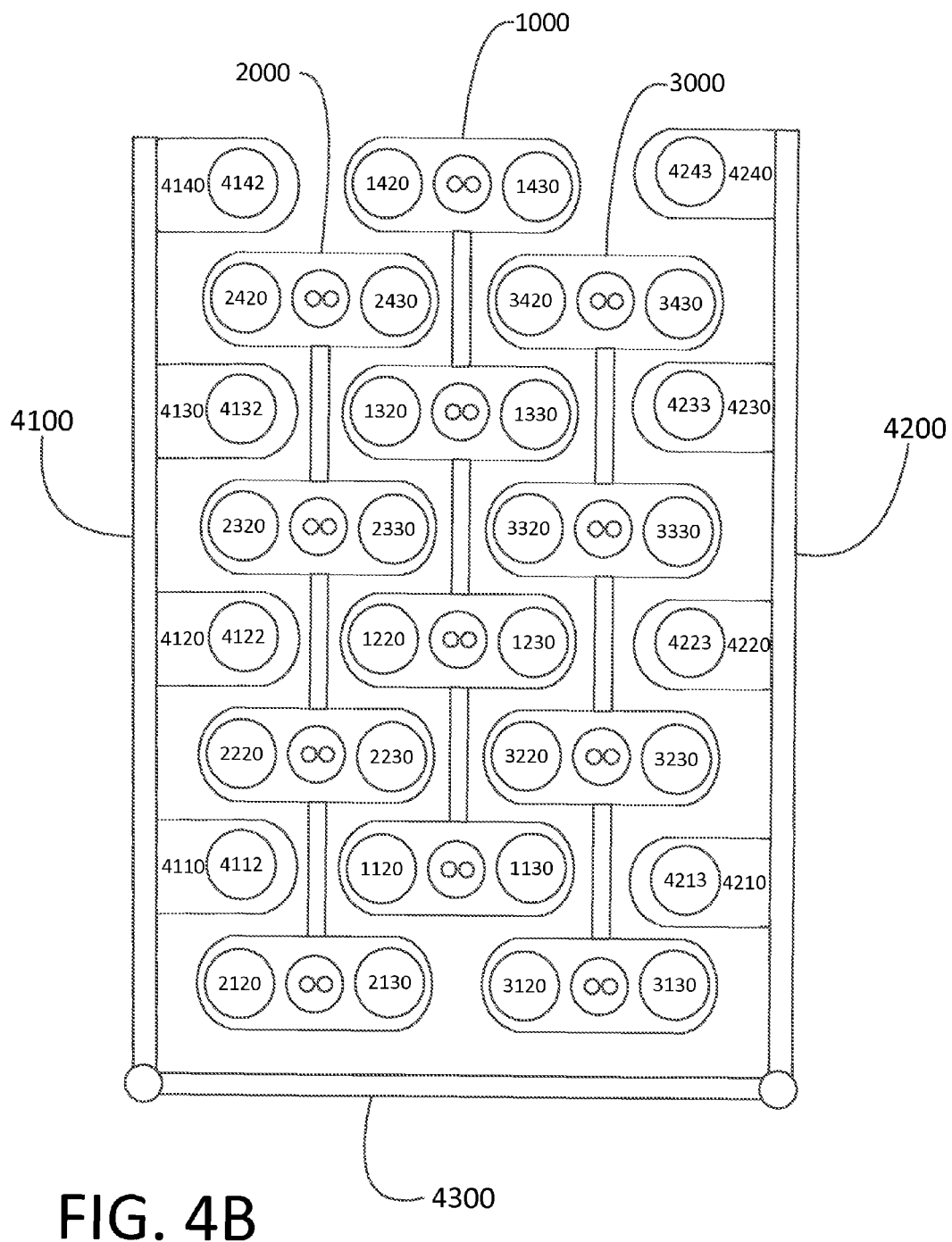
FIG. 4B shows an example of the adjustable clamp sleeve used with the interlocked bundle.

FIG. 4B illustrates an example of an adjustable clamp sleeve 4000 securing the interlocked bundle 5000. According to the example shown, the expandable hinge 4300 may be elongated to accommodate the interlocked bundle 5000. In this example, eighth fiber optic cable 2400 may be inserted into a slot between the third protuberance 4130 and the fourth protuberance 4140 on the actuating arm 4100; the seventh fiber optic cable 2300 may be inserted into the slot between the third protuberance 4130 and the second protuberance 4120 on the first actuating arm 4100; the sixth fiber optic cable 2200 may be inserted into the slot between the second protuberance 4120 and the first protuberance 4110; and the fifth fiber optic cable 2100 may be inserted between the first protuberance 4110 and the hinge 4300.

Further to this example, twelfth fiber optic cable 3400 may be inserted into a slot between the eighth protuberance 4240 and the seventh protuberance 4230 on the second actuating arm 4200; the eleventh fiber optic cable 3300 may be inserted into the slot between the seventh protuberance 4230 and the sixth protuberance 4220 on the second actuating arm 4200; the tenth fiber optic cable 3200 may be inserted into the slot between the sixth protuberance 4220 and the fifth protuberance 4210; and the ninth fiber optic cable 3100 may be inserted between the fifth protuberance 4210 and the hinge 4300.

Furthermore, each of the protuberances of the adjustable clamp sleeve 4000 may be inserted into a slot on the bundled fiber cable 2000. For example, the first protuberance may be inserted in the slot between the fifth fiber optic cable 2100 and the sixth fiber optic cable 2200; the second protuberance 4120 may interlock in the slots formed between the sixth fiber optic cable 2200 and the seventh fiber optic cable 2300; and the third protuberance 4130 may be inserted into the slot formed between the seventh fiber optic cable 2300 and the eighth fiber optic cable 2400. The fourth protuberance 4140 may sit on top of the eighth fiber optic cable 2400. For example, the fourth protuberance 4140 may interconnect with a plurality of tabs and grooves located on the top of the eight fiber optic cable 2400.

Similarly, the fifth protuberance 4210 may be inserted into the slot between the ninth fiber optic cable 3100 and the tenth fiber optic cable 3200; the tenth protuberance 4220 may be inserted into the slot between the tenth fiber optic cable 3200 and the eleventh fiber optic cable 3300; and the seventh protuberance 4230 may be inserted between the eleventh fiber optic cable 3300 and the twelfth fiber optic cable 3400. The eighth protuberance 4240 may connect with a plurality of tabs and grooves located on the top of the twelfth fiber optic cable 3400. In some examples, the plurality of tabs and grooves of each protuberance may interconnect with the tabs and grooves of the fiber optic cables to create a more secure interconnection between the adjustable clamp sleeve 4000 and the interlocked bundled 5000.

As discussed above, the dielectric strength members of the interlocked bundle may align. Further, the exterior dielectric strength members of the interlocked bundle 5000 may align with the dielectric strength members of the adjustable clamp sleeve 4000 when the adjustable clamp sleeve 4000 is closed around the interlocked bundled 5000. For example, the dielectric strength members 4142, 2420, 4132, 2320, 4122, 2220, 4112, and 2120 may align when the adjustable clamp sleeve 4000 encloses the interlocked bundled 5000. Further, the dielectric strength members 4243, 3430, 4233, 3330, 4223, 3230, 4213, and 3130 may be in the same plane when the protuberances of the adjustable clamp sleeve 4000 interconnect with the fiber optic cables of the interlocked bundle 5000. Accordingly, aligning the strength members may provide additional support and mitigate shearing of the fiber strands.

Figure 4C:
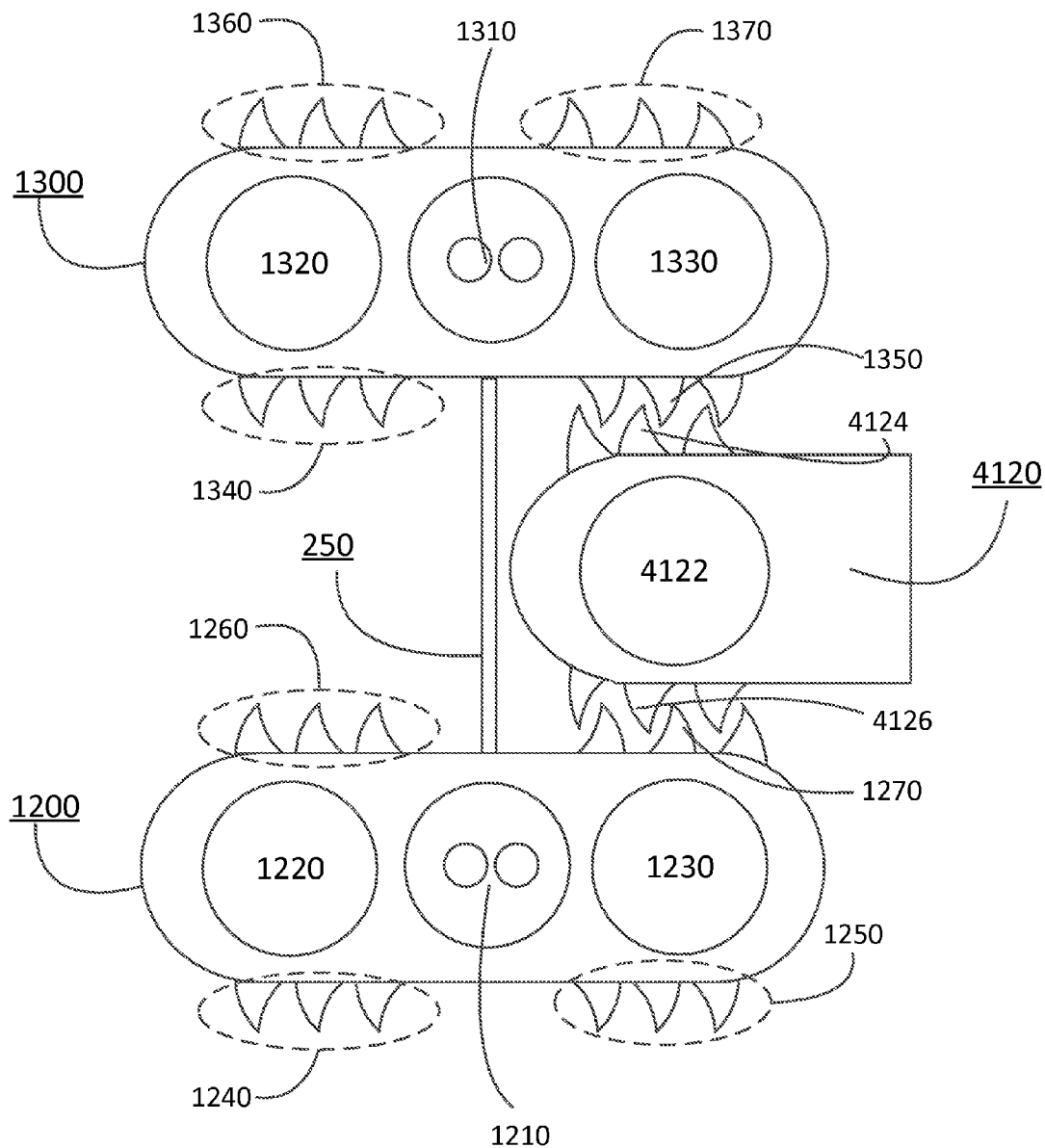
FIG. 4C illustrates an example of the protuberances interconnecting with fiber optic cables.

Turning to FIG. 4C, an example of the interconnection between the plurality of tabs and grooves of two fiber optic cables and one of the protuberances is shown. In particular, FIG. 4C shows the second protuberance 4120 inserted into the slot formed by the second fiber optic cable 1200, the webbing 250, and the third fiber optic cable 1300.

The second protuberance 4120 includes a dielectric strength member 4122, a second plurality of tabs and grooves 4124, and a third plurality of tabs and grooves 4126.

The second fiber optic cable 1200 includes a plurality of fiber strands 1210, a first dielectric strength member 1220, a second dielectric strength member 1230, a first plurality of tabs and grooves 1240, a second plurality of tabs and grooves 1250, a third plurality of tabs and grooves 1260, and a fourth plurality of tabs and grooves 1270.

The third fiber optic cable 1300 includes a plurality of fiber strands 1310, a first dielectric strength member 1320, a second dielectric strength member 1330, a first plurality of tabs and grooves 1340, a second plurality of tabs and grooves 1350, a third plurality of tabs and grooves 1360, and a fourth plurality of tabs and grooves 1370.

Referring to FIG. 4C, the second plurality of tabs and grooves 1350 are interconnected with the second plurality of tabs and grooves 4124 of the protuberance 4120. FIG. 4C also shows the fourth plurality of tabs and grooves 1270 interconnecting with the third plurality of tabs and grooves 4126 of the protuberance 4120. In this regard, the plurality of tabs and grooves located on each of the fiber optic cables and the protuberances interconnect to further secure the bundled fiber optic cables and the adjustable clamp sleeve. While FIG. 4C illustrates the use of tabs and grooves, different types of interconnecting techniques may be used, such as tongue and groove connections, interlocking pieces, male-female connections, etc.

Figure 5:
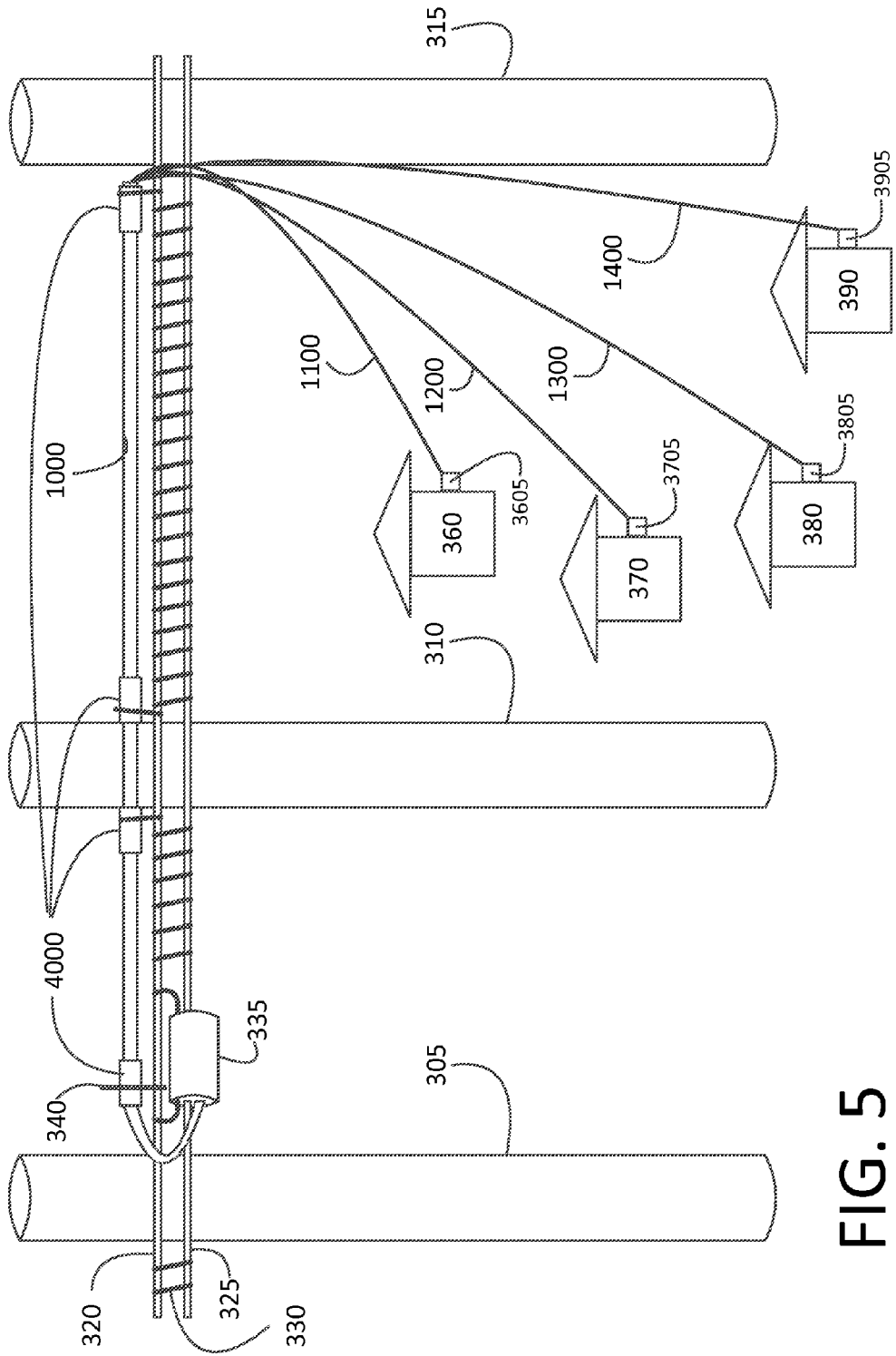
FIG. 5 shows an example of the adjustable clamp sleeve being installed.

FIG. 5 illustrates one example of the adjustable clamp sleeve 4000 installed on bundled fiber optic cable 1000. In this regard, FIG. 5 includes a first utility pole 305; a second utility pole 310; a third utility pole 315; a first house 360; a second house 370; a third house 380; and a fourth house 390. Each house may have a network interface unit (NIU). For example, the first house 360 has a first NIU 3605, the second house 370 has a second NIU 3705, the third house 380 has a third NIU 3805, and the fourth house 390 has a fourth NIU 3905.

A support strand 320 is connected to each of the first utility pole 305, the second utility pole 310, and the third utility pole 315. A fiber optic cable 325 may be connected to the support strand 320 via fiber optic support hardware 330. The fiber optic support hardware 330 may include, for example, a J-hook, a drop-wire clamp, a span clamp, or any combination thereof. Additionally, a network access point (NAP) 335 may be connected to the support strand 320 or a utility pole. Prior to being secured to the utility poles or the support strand, the adjustable clamp sleeve 4000 may be attached to the bundled fiber cable 1000. The bundled fiber cable 1000 with the attached adjustable clamp sleeve 4000 attached may be connected to NAP 335 and secured to the support strand 320 using bundled fiber cable support hardware 340, such as a J-hook, a drop-wire clamp, a span clamp, or any combination thereof. In this regard, the fiber cable support hardware 340 may be tightened over the adjustable clamp sleeve 4000 to reduce the strain fiber cable support hardware 340 may have on the bundled fiber cable 1000. The bundled fiber cable 1000 may include a first fiber optic cable 1100, a second fiber optic cable 1200, a third fiber optic cable 1300, and a fourth fiber optic cable 1400. In this regard, each fiber optic cable of the bundled fiber cable 1000 may connect the NIU at the customer home to the NAP located on the support strand or utility pole.

For example, the house 390 in FIG. 5 may be considered the farthest from the NAP 335. The bundled fiber cable 1000 may be cut to a predetermined length from the NAP 335 to the NIU 3905. The bundled fiber cable 1000 may be secured to the utility poles 305, 310, or 315, the support strand 320, or a combination of both. As noted above, the fiber cable support hardware 340 may be tightened around the adjustable clamp sleeve 4000 to secure the bundled fiber cable 1000 to the utility poles 305, 310, or 315 or the support strand 320. After the bundled fiber cable 1000 has been secured, the technician may cut the webbing connecting the fourth fiber optic cable 1400 and the third fiber optic cable 1300. The fourth fiber optic cable 1400 may then be separated from the third fiber optic cable 1300 and the rest of the bundled fiber cable 1000, for example, by peeling the fiber optic cable 1400 away from the group. Accordingly, the fiber optic cable 1400 may connect the NIU 3905 to the NAP 335 to provide a communication channel for the customer home 390.

The process may be repeated for the remaining homes. For example, the webbing between the third fiber optic cable 1300 and the second fiber optic cable 1200 may be cut. The third fiber optic cable 1300 may be peeled from the second fiber optic cable 1200 and the bundled fiber cable 1000. The fiber optic cable 1300 may then be connected to the NIU 3805, thereby providing a communication channel between the customer home 380 and the NAP 335.

Similarly, the webbing between the second fiber optic cable 1200 and the first fiber optic cable 1100 may be cut. The second fiber optic cable 1200 may be detached from the first fiber optic 1100. Accordingly, the second fiber optic cable 1200 may be connected to the NIU 3705 to provide a communication channel to the house 370. Additionally, the first fiber optic cable 1100 may be connected to the NIU 3605, such that a communication channel for home 360 is established between NIU 3605 and NAP 305. The aesthetics of the aerial plant may thus appear that of a single wire rather than individual fiber cables lashed to the support strand.

Figure 6:
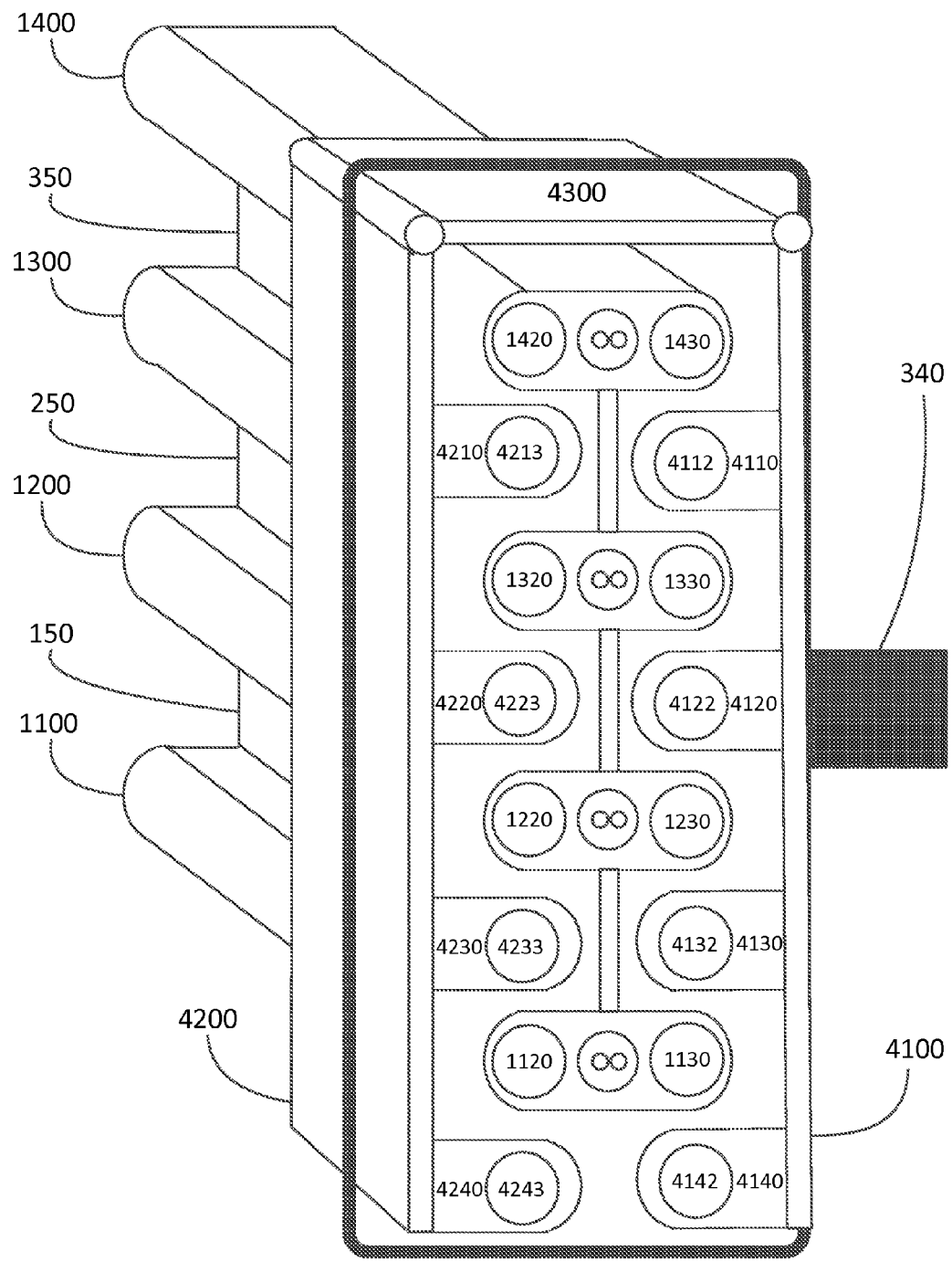
FIG. 6 illustrates an example of a clamp tightened on the adjustable clamp sleeve.

Turning to FIG. 6, an example of the adjustable clamp sleeve 4000 clamped onto the bundled fiber cable 1000 and secured to a utility pole using fiber cable support hardware 340. As noted above, the adjustable clamp sleeve 4000 may be secured to the bundled fiber cable 1000 before the bundled fiber cable 1000 is attached to a utility pole. Accordingly, fiber cable support hardware 340, such as a wire clamp, may wrap around the attached adjustable clamp sleeve 4000 when securing the bundled fiber cable 1000 to a utility pole. In this regard, the adjustable clamp sleeve 4000 distributes the stress and strain the fiber cable support hardware 340 may have on the bundled fiber cable. Although, FIG. 6 is shown with the bundled fiber cable 1000, a similar implementation may be realized with respect to the interlocked bundle 5000 based on the examples described herein.

While the examples described herein refer to fiber optic cables, one of ordinary skill in the art would recognize the applicability of the examples described herein to other types of cables, such as communication cables, coaxial cables, power cables, phone lines, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A clamp sleeve for securing fiber cables comprising:
    a first actuating arm including at least a first protuberance, a second protuberance, and a third protuberance;
    a first slot between the first protuberance and the second protuberance;
    a second slot between the second protuberance and the third protuberance;
    a second actuating arm including at least a fourth protuberance, a fifth protuberance, and a sixth protuberance;
    a third slot between the fourth protuberance and the fifth protuberance;
    a fourth slot between the fifth protuberance and the sixth protuberance; and
    a hinge to connect the first actuating arm to the second actuating arm, the hinge including a first pivot, a second pivot, and a connecting member therebetween, the first pivot further connected to the first actuating arm, and the second pivot connected to the second actuating arm.

2. The clamp sleeve according to claim 1, wherein the hinge is an expandable hinge.

3. The clamp sleeve according to claim 2, wherein the connecting member of the expandable hinge has repeated folding that can be expanded to elongate the connecting member.

4. The clamp sleeve according to claim 1, further comprising:
    a first strength member located within the first protuberance;
    a second strength member located within the second protuberance; and
    a third strength member located within the third protuberance.

5. The clamp sleeve according to claim 4, further comprising:
    a fourth strength member located within the fourth protuberance;
    a fifth strength member located within the fifth protuberance; and
    a six strength member located within the sixth protuberance.

6. The claim sleeve according to claim 5, wherein the strength members are made of a dielectric material.

7. The clamp sleeve according to claim 1, further comprising:
    a first plurality of tabs and grooves located on a surface of the first protuberance;
    a second plurality of tabs and grooves located on a surface of the second protuberance; and
    a third plurality of tabs and grooves located on a surface of the third protuberance.

8. The clamp sleeve according to claim 7, further comprising:
    a fourth plurality of tabs and grooves located on a surface of the fourth protuberance;
    a fifth plurality of tabs and grooves located on a surface of the fifth protuberance; and
    a sixth plurality of tabs and grooves located on a surface of the sixth protuberance.

9. The clamp sleeve according to claim 1, wherein the clamp sleeve further comprises:
    an outer material, wherein the coefficient of friction between support hardware positioned around the clamp sleeve, and the outer material of the clamp sleeve is greater than or equal to one.

10. A system for securing fiber cables comprising:
    at least one network access point;
    a plurality of network interface units;
    a plurality of communication cables interconnecting the plurality of network interface units with the at least one network access point; and a clamp sleeve for securing the plurality of communication cables interconnecting the plurality of network interface units with the at least one network access point, the clamp sleeve comprising a first and second actuating arms, and a hinge connecting the first actuating arm to the second actuating arm, the hinge including a first pivot coupled to the first actuating arm, a second pivot coupled to the second actuating arm, and a connecting member therebetween, wherein the first actuating arm, hinge, and second actuating arm close around the plurality of communication cables.

11. The system of claim 10, wherein the clamp sleeve further comprises:
   the first actuating arm including at least a first protuberance, a second protuberance, and a third protuberance;
   a first slot between the first protuberance and the second protuberance;
   a second slot between the second protuberance and the third protuberance;
   the second actuating arm including at least a fourth protuberance, a fifth protuberance, and a sixth protuberance;
   a third slot between the fourth protuberance and the fifth protuberance;
   a fourth slot between the fifth protuberance and the sixth protuberance.

12. The system of claim 11, wherein the hinge is an expandable hinge.

13. The system of claim 12, wherein the connecting member of the expandable hinge has repeated folding that can be expanded to elongate the connecting member.

14. The system of claim 11, wherein the clamp sleeve further comprises:
   a first strength member located within the first protuberance;
   a second strength member located within the second protuberance; and
   a third strength member located within the third protuberance.

15. The system of claim 14, further comprising:
   a fourth strength member located within the fourth protuberance;
   a fifth strength member located within the fifth protuberance; and
   a six strength member located within the six protuberance.

16. The system of claim 15, wherein the strength members are made of a dielectric material.

17. The system of claim 11, wherein the clamp sleeve further comprises:
   a first plurality of tabs and grooves located on a surface of the first protuberance;
   a second plurality of tabs and grooves located on a surface of the second protuberance; and
   a third plurality of tabs and grooves located on a surface of the third protuberance.

18. The system of claim 17, further comprising:
   a fourth plurality of tabs and grooves located on a surface of the fourth protuberance;
   a fifth plurality of tabs and grooves located on a surface of the fifth protuberance; and
   a sixth plurality of tabs and grooves located on a surface of the sixth protuberance.

19. The system of claim 10, wherein the clamp sleeve further comprises:
   an outer material,
   wherein the coefficient of friction between support hardware positioned around the clamp sleeve, and the outer material of the clamp sleeve is greater than or equal to one.

20. The system of claim 19, wherein the outer material is rubber.

* * * * *